(12) United States Patent
He

(10) Patent No.: US 8,510,037 B2
(45) Date of Patent: Aug. 13, 2013

(54) SMART NAVIGATION DEVICE AND NAVIGATION METHOD THEREOF

(75) Inventor: Ai-Hua He, Shanghai (CN)

(73) Assignees: MiTAC International Corp., Kuei San Township (TW); MiTAC Research (Shanghai) Ltd., Shanghai (CN)

( * ) Notice: Subject to any disclaimer, the term of this patent is extended or adjusted under 35 U.S.C. 154(b) by 32 days.

(21) Appl. No.: 13/223,734

(22) Filed: Sep. 1, 2011

(65) Prior Publication Data

US 2013/0035850 A1 Feb. 7, 2013

(30) Foreign Application Priority Data

Aug. 1, 2011 (CN) .......................... 2011 1 0218639

(51) Int. Cl.
*G05D 1/00* (2006.01)
*G05D 1/08* (2006.01)
*G06F 7/00* (2006.01)
*G06F 17/00* (2006.01)

(52) U.S. Cl.
USPC ........................................ 701/425; 701/439

(58) Field of Classification Search
USPC .......................................... 701/201, 540, 416
See application file for complete search history.

(56) References Cited

U.S. PATENT DOCUMENTS

| | | | | |
|---|---|---|---|---|
| 5,991,689 A | * | 11/1999 | Aito et al. | ...................... 701/416 |
| 2012/0101728 A1 | * | 4/2012 | Kudo | ........................... 701/540 |

* cited by examiner

*Primary Examiner* — Thomas Black
*Assistant Examiner* — Robert Payne
(74) *Attorney, Agent, or Firm* — Wang Law Firm, Inc.; Li K. Wang; Stephen Hsu

(57) ABSTRACT

A smart navigation device includes a storage unit for storing map information therein, a positioning module for determining a current location, and a navigation module for generating a navigation route based on a target location, the current location, and the map information. When the navigation route includes a plurality of toll roads and one of which is selected to be excluded from the navigation route, the navigation module re-plans to generate a cost-saving navigation route. Therefore, a user is allowed to select and avoid any toll road on the navigation route. A smart navigation method applicable to vehicle navigation is also disclosed.

10 Claims, 8 Drawing Sheets

SMART NAVIGATION DEVICE AND NAVIGATION METHOD THEREOF

FIELD OF THE INVENTION

This application claims priority from China Patent Application No. 201110218639.3, filed on Aug. 1, 2011, the contents of which are hereby incorporated by reference in their entirety for all purposes.

The present invention relates to a navigation device, and more particularly to a smart navigation device capable of generating a navigation route that avoids a user-selected toll road.

BACKGROUND OF THE INVENTION

With the progress in the Global Positioning System (GPS) navigation device in recent years, the development of hand-held navigation device has gradually become matured. The hand-held navigation device can propose an optimal route when a user is driving toward a target location.

Generally, all the currently available navigation devices are able to provide different route planning functions, such as the fastest route planning function and the shortest route planning function. When the time factor is important to a user, the user would usually select the fastest route planning function. On the other hand, when the distance factor is important to the user, the user may select the shortest route planning function. When the fastest route planning function is selected, the navigation device would usually include freeways or viaducts, which are usually toll roads or toll bridges, in the navigation route. On the other hand, when the shortest route planning function is selected, the navigation device would usually include the toll-free surface roads and avoid all the toll roads.

However, the above two route planning functions fail to satisfy all the user's needs. For example, there are chances some part of a freeway on the navigation route is under construction or the user simply does not want to drive through a certain part of the freeway on the navigation route. Under these conditions, neither of the above two route planning functions is able to satisfy the user's need.

SUMMARY OF THE INVENTION

A primary object of the present invention is to provide a smart navigation device and a navigation method thereof, so as to overcome the drawbacks in the prior art navigation device to effectively plan a user-desired navigation route.

To achieve the above and other objects, the smart navigation device according to the present invention includes a storage unit, a positioning module, and a navigation module. The storage unit stores map information therein; the positioning module determines a current location, and the navigation module generates a navigation route based on a target location, the current location, and the map information. When the navigation route includes a plurality of toll roads and one of which is selected to be excluded from the navigation route, the navigation module re-plans to generate a cost-saving navigation route that does not include the toll road having been selected to exclude.

In an embodiment of the present invention, the smart navigation device further includes an input module electrically connected to the navigation module, so that a user may input the target location via the input module.

To achieve the above and other objects, the smart navigation method according to the present invention includes the following steps: storing map information in a storage unit; determining a current location via a positioning module; generating a navigation route via a navigation module basing on a target location, the current location and the map information; and when the navigation route including a plurality of toll roads and one of which being selected to be excluded from the navigation route, the navigation module generating a cost-saving navigation route that does not include the toll road having been selected to exclude.

In an embodiment of the smart navigation method, the following step is further included: inputting the target location by a user via an input module that is electrically connected to the navigation module.

With the above arrangements, the smart navigation device and method according to the present invention provides one or more of the following advantages:

(1) The smart navigation device and method allows a user to select a toll road to be avoided, and re-plans a user desired navigation route, so that the generated navigation route is effective for use.

(2) The smart navigation device and method allow a user to select a navigation route according to actual need, so as to drive through toll-free roads to save tolls.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
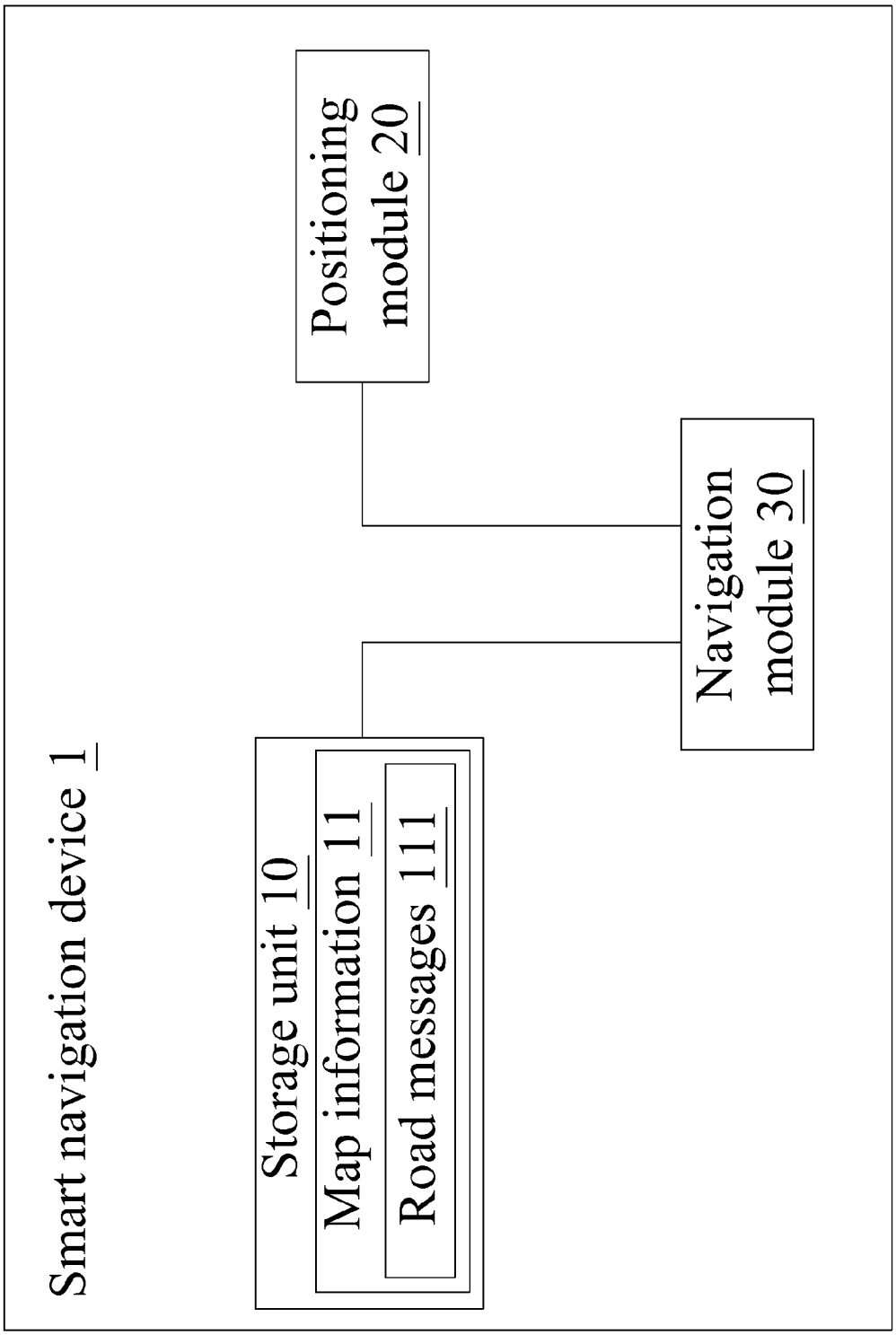
FIG. 1 is a block diagram of a smart navigation device according to a first embodiment of the present invention.

The present invention will now be described with some preferred embodiments thereof and with reference to the accompanying drawings. For the purpose of easy to understand, elements that are the same in the preferred embodiments are denoted by the same reference numerals. Please refer to FIG. 1 that is a block diagram of a smart navigation device 1 according to a first embodiment of the present invention. The smart navigation device 1 is applicable to vehicle navigation. As shown, the smart navigation device 1 includes a storage unit 10, a positioning module 20, and a navigation module 30.

The storage unit 10 stores one or more map information 11 therein. In the illustrated first embodiment, while there is shown only one map information 11 stored in the storage unit 10, it is understood the present invention is not limited thereto. The map information 11 includes a plurality of road messages 111 in connection with different roads.

The positioning module 20 serves to detect a current location of a vehicle, and can be a Global Positioning System (GPS) for receiving satellite positioning signals transmitted from a satellite in order to obtain the current location of the vehicle. Alternatively, the positioning module 20 can be an Assisted Global Positioning System (AGPS) for receiving reference coordinates and time provided by a base station to shorten the time needed for positioning. In this manner, it is able to more quickly and more accurately determine the current location of the vehicle.

The navigation module 30 is electrically connected to the storage unit 10 and the positioning module 20, and serves to plan a navigation route based on a target location selected by a user, the current location, and the road messages 111 in the map information 11. The navigation module 30 is able to provide multiple navigation modes of different orientations, such as fastest navigation mode, shortest navigation mode, and cost-saving navigation mode.

Figure 2:
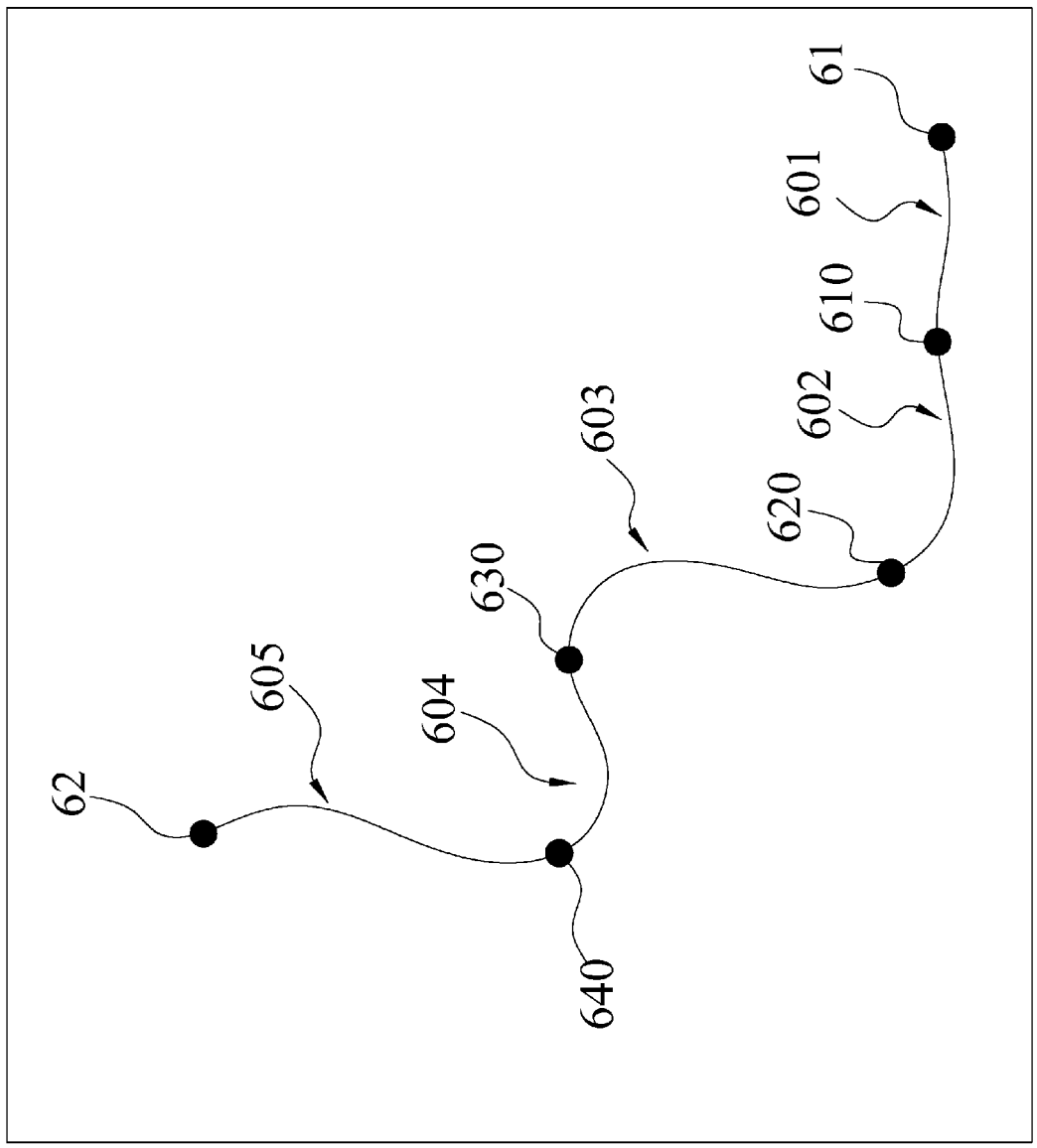
FIG. 2 schematically shows an example of a navigation route planned by the smart navigation device according to the first embodiment of the present invention.

When a user selects the fastest navigation mode, the navigation module 30 would generate a fastest navigation route that mainly includes freeways, as shown in FIG. 2, so as to achieve the purpose of saving as much time as possible. In FIG. 2, there are total four waypoints 610, 620, 630 and 640 on the route between a current location 61 and a target location 62, and the route involves five different roads 601, 602, 603, 604 and 605. Wherein, the first and the third waypoint 610, 630 are toll gates on freeways, and the second and the fourth road 602, 604 are therefore defined as toll roads. Thus, when the user decides to drive through the navigation route shown in FIG. 2, the user has to use two toll roads 602, 604. This means the user has to pay the tolls required to use these toll roads.

Figure 3:
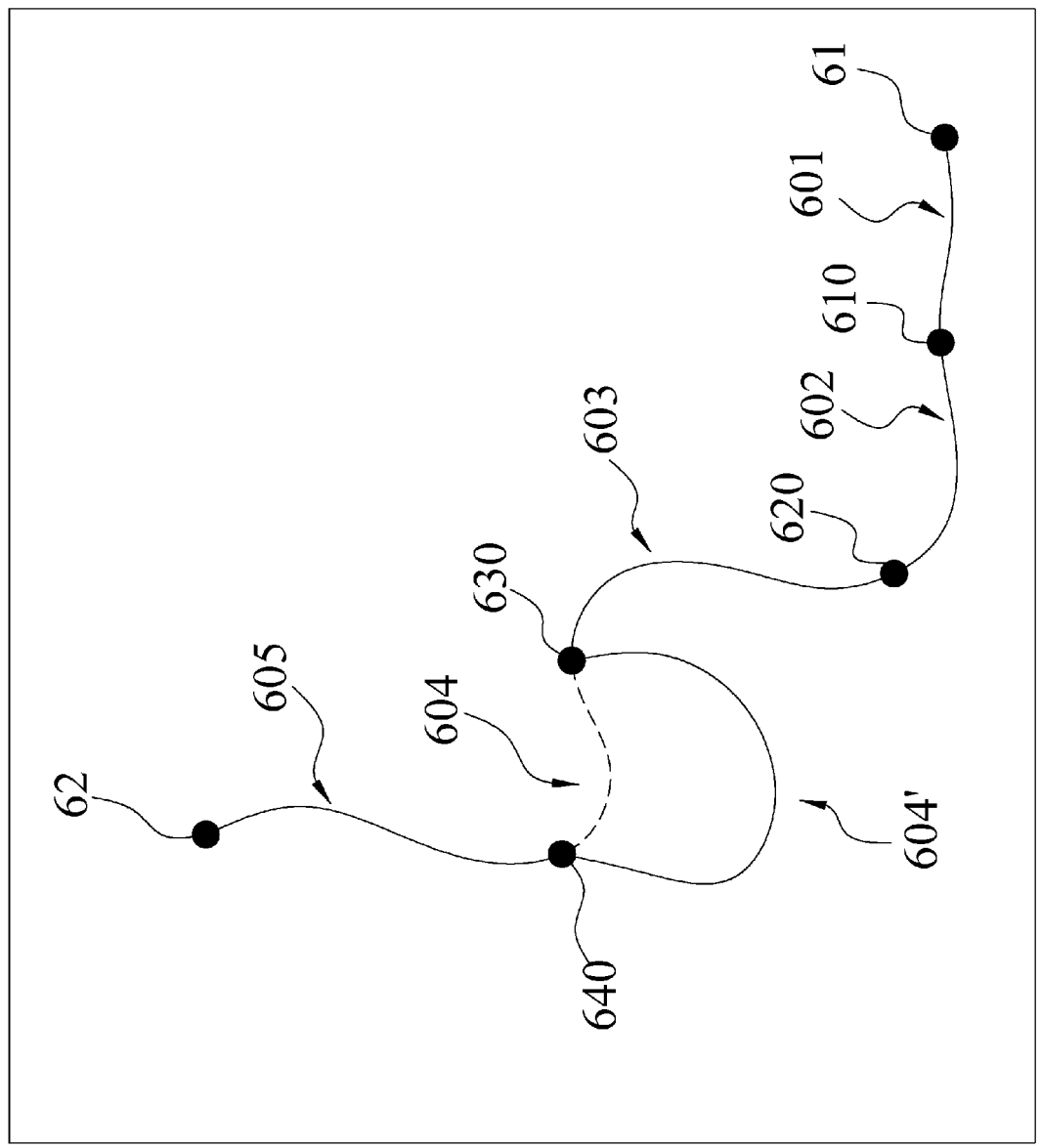
FIG. 3 schematically shows an example of a cost-saving navigation route planned by the smart navigation device according to the first embodiment of the present invention.

When the fourth road, i.e. the second toll road 604, currently has a traffic congestion problem, or when the user wants to save the toll for the second toll road 604, the user may select the cost-saving navigation mode to avoid from driving through the second toll road 604. When the smart navigation device 1 of the present invention is in the cost-saving navigation mode and the user selects to exclude the second toll road 604 from the original navigation route, the navigation module 30 will use the road messages 111 in the map information 11 to re-plan a substitute road 604' between the waypoints 630 and 640, as shown in FIG. 3, so as to substitute for the second toll road 604 in the originally planned navigation route. Therefore, the smart navigation device 1 of the present invention is able to plan a new cost-saving road, so that the user may, at his or her discretion, select the toll road to be excluded from the navigation route in order to save money or avoid road with traffic congestion.

Figure 4:
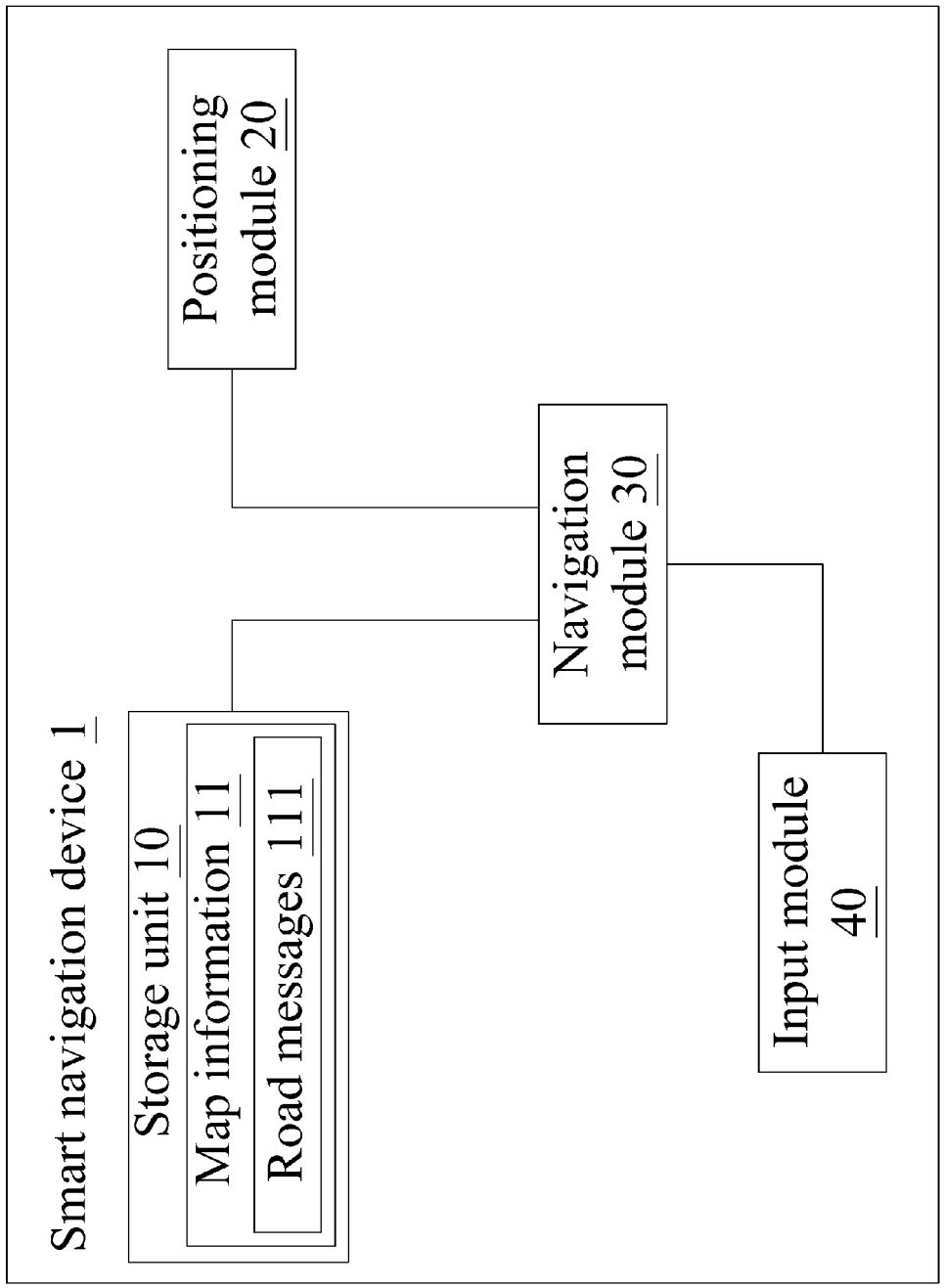
FIG. 4 is a block diagram of a smart navigation device according to a second embodiment of the present invention.

FIG. 4 is a block diagram of a smart navigation device 1 according to a second embodiment of the present invention. The second embodiment is different from the first embodiment in further including an input module 40. Herein, only the difference between the two embodiments will be described while all other structures that are the same in the two embodiments are not repeatedly discussed. As shown in FIG. 4, the input module 40 is electrically connected to the navigation module 30 for a user to input a target location and select the toll road to be excluded from the navigation route. The input module 40 can include push keys or a touch screen, so that the user may depress the push keys or touch the screen with a touch pen to input necessary instruction. In the illustrated second embodiment, the input module 40 is a touch screen without being limited thereto.

Figure 5:
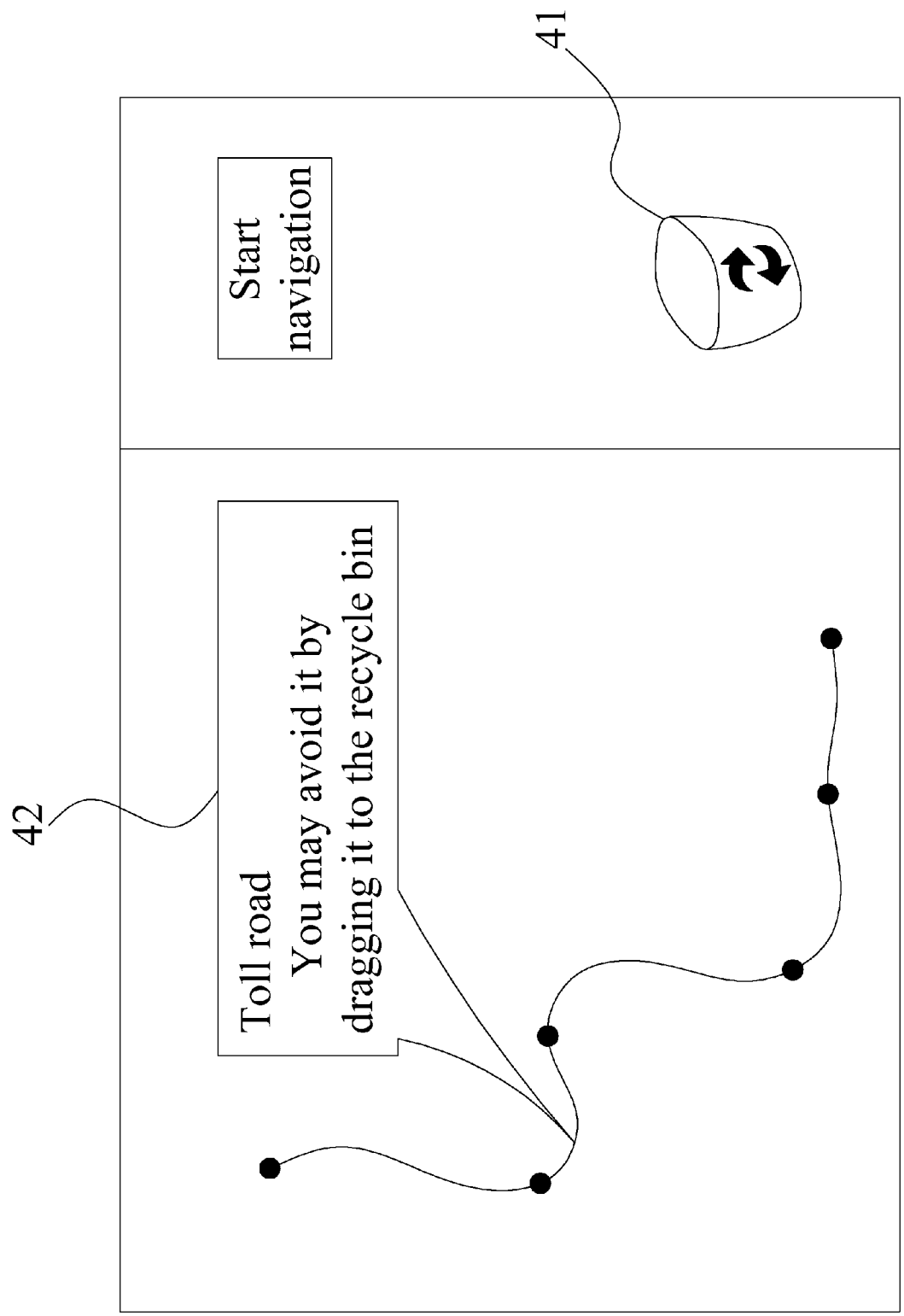
FIG. 5 is a schematic view of a touch screen for the smart navigation device according to the second embodiment of the present invention.

Please refer to FIG. 5 that schematically shows the touch screen for the smart navigation device 1 according to the second embodiment of the present invention. When the smart navigation device 1 is in the cost-saving navigation mode and the user touches the screen to select a toll road to be excluded from the navigation route, a toll road avoidance icon 41 will be displayed on the touch screen and a prompt of exclusion 42 will also be shown on the screen near the selected toll road. The toll road avoidance icon 41 allows the user to touch or drag the selected second toll road 604 to the toll road avoidance icon 41, so that the smart navigation device 1 of the present invention can plan a cost-saving navigation route. The exclusion prompt 42 serves to remind the user of the operation manner of touching the screen or dragging the selected toll road.

For the user to easily distinguish the toll roads from the toll-free roads on the touch screen, the smart navigation device 1 of the present invention is able to display the toll roads and the toll-free roads in at least two different colors. That is, the user can clearly know from the colors on the touch screen which roads are allowed to drag. For instance, the toll roads that can be dragged are displayed in red color while all other portions of the navigation route are displayed in blue color. In this manner, the user can clearly recognize which roads on the touch screen are toll roads that can be avoided by dragging them to the toll road avoidance icon 41 and which roads are toll-free roads.

Figure 6:
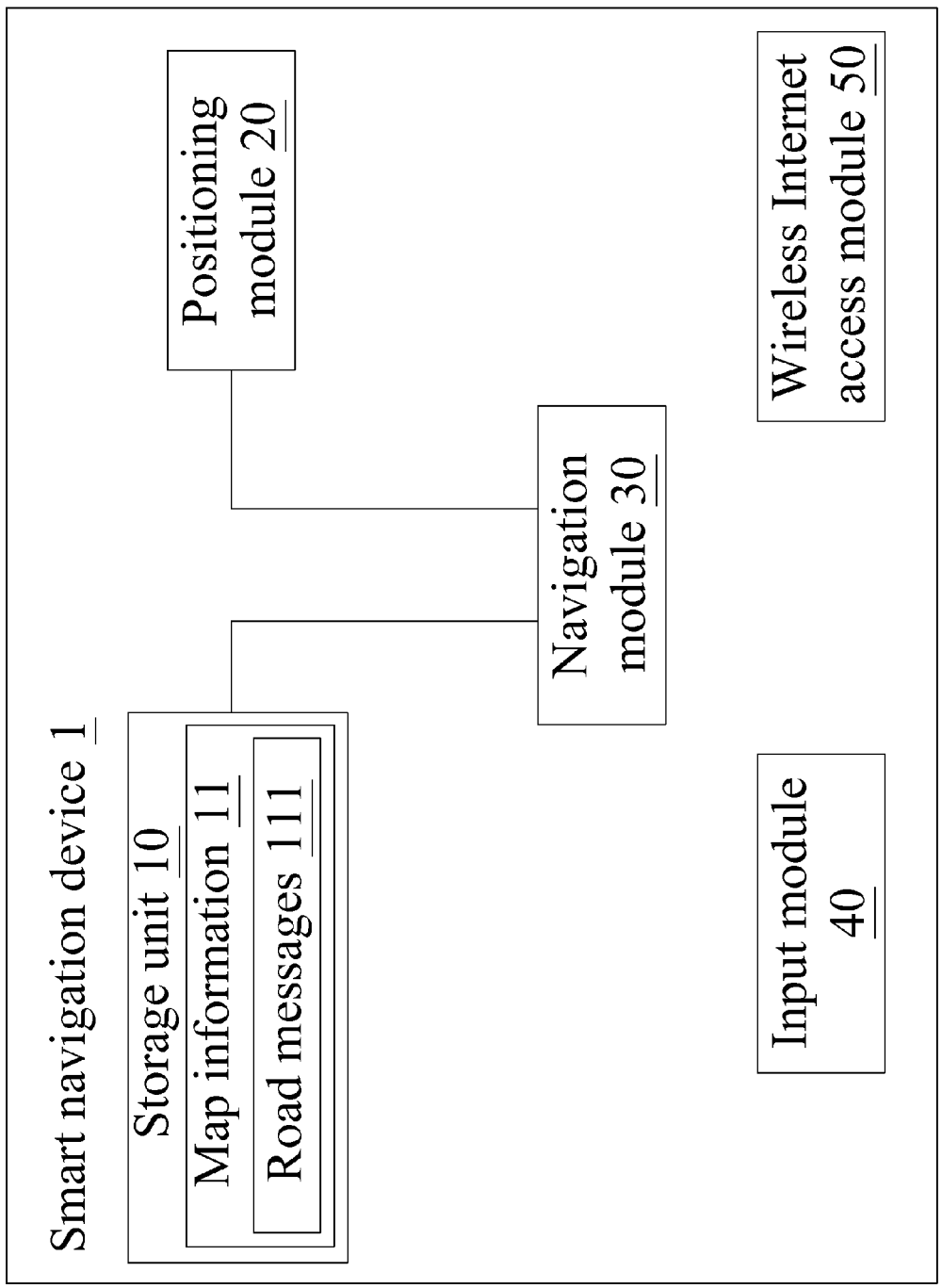
FIG. 6 is a block diagram of a smart navigation device according to a third embodiment of the present invention.
Figure 7:
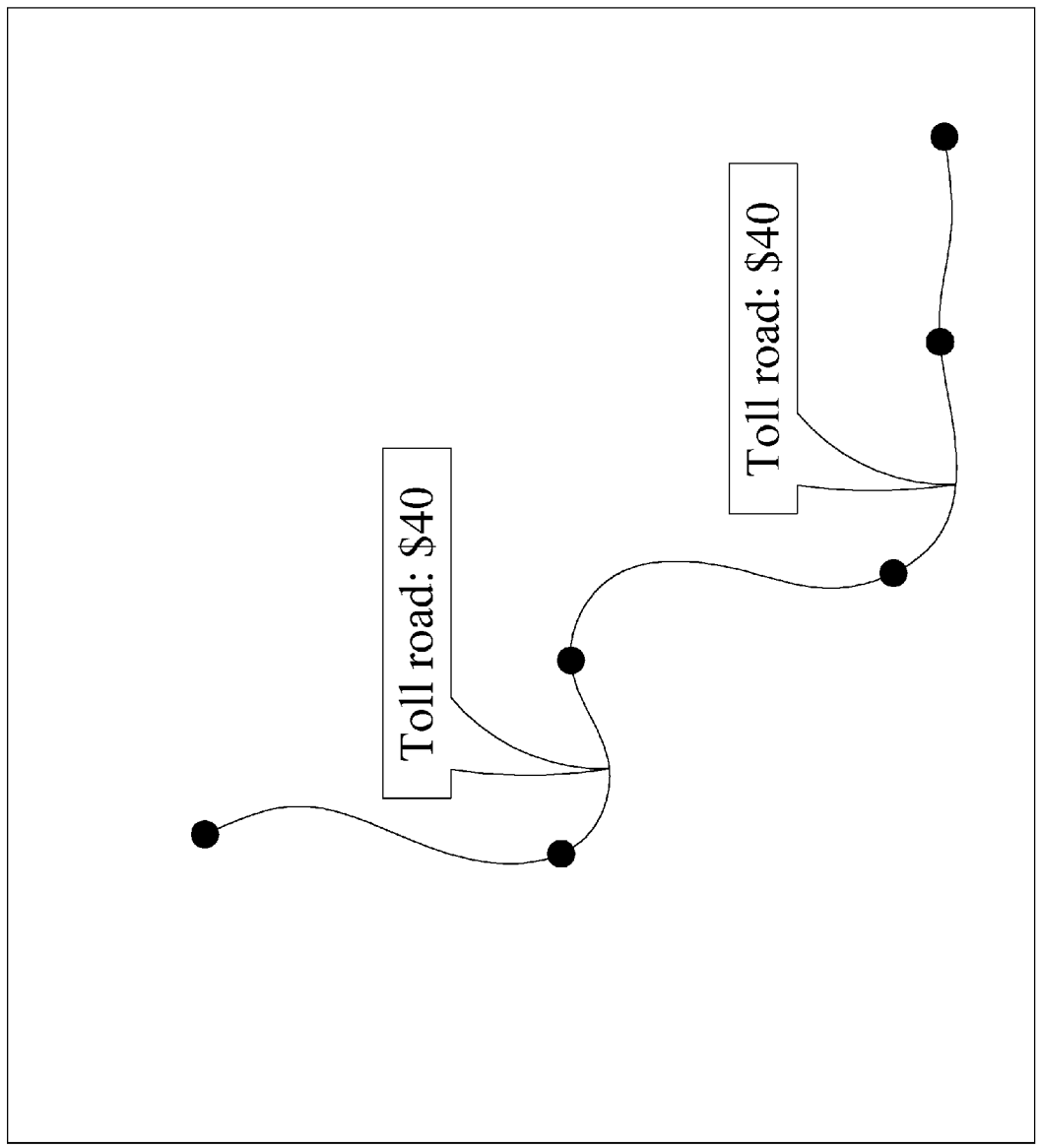
FIG. 7 is a schematic view of a touch screen for the smart navigation device according to the third embodiment of the present invention.

Please refer to FIG. 6 that is a block diagram of a smart navigation device 1 according to a third embodiment of the present invention. The third embodiment is different from the second embodiment in further including a wireless Internet access module 50. Herein, only the difference between the two embodiments will be described while all other structures that are the same in the two embodiments are not repeatedly discussed. As shown in FIG. 6, the wireless Internet access module 50 is electrically connected to the navigation module 30 for a user to wirelessly receive information about the tolls being charged by different toll roads provided by networking base stations. Meanwhile, the toll information for each of the toll roads on the navigation route or the cost-saving navigation route will be displayed on the touch screen of the input module 40, as shown in FIG. 7.

Figure 8:
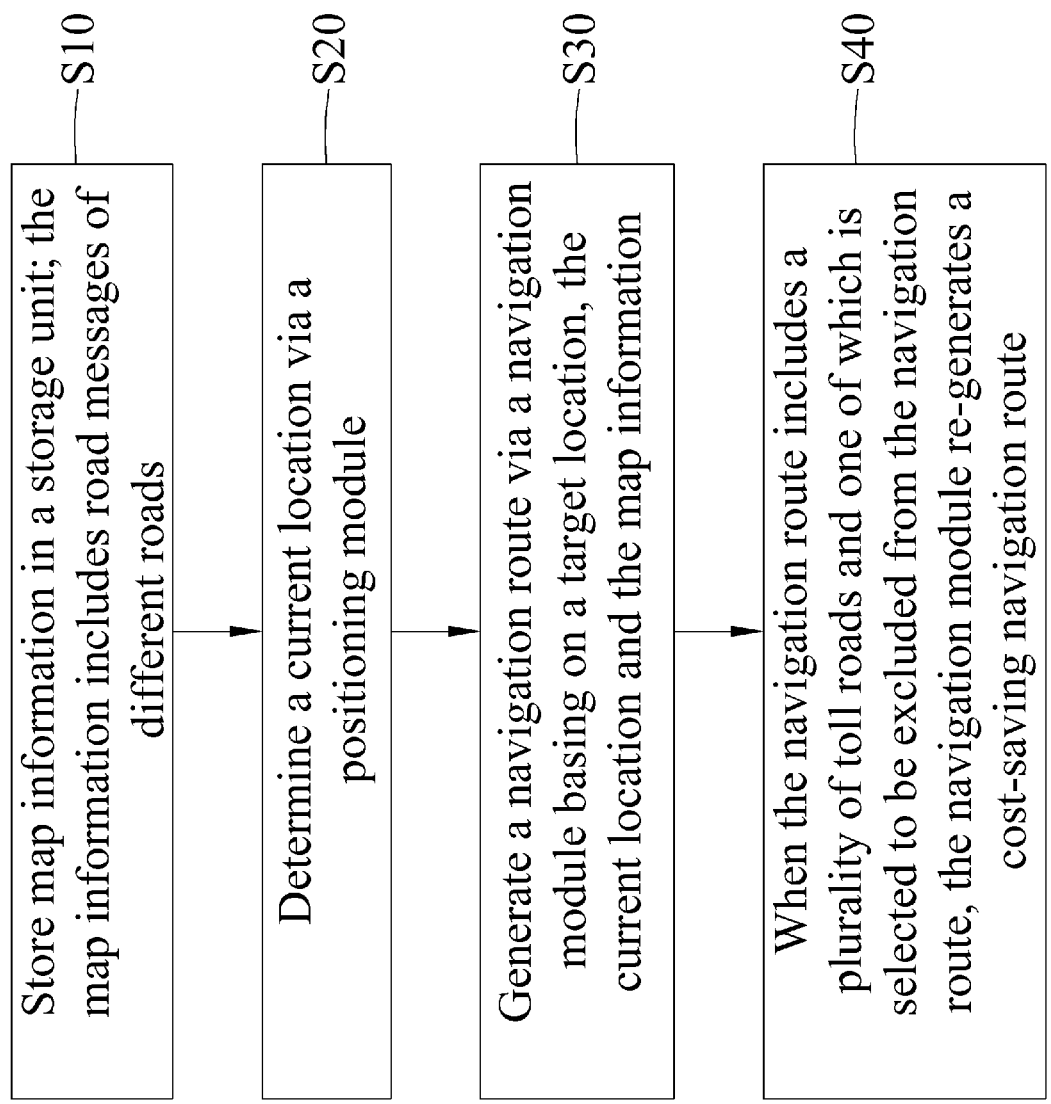
FIG. 8 is a flowchart showing the steps included in a smart navigation method according to the present invention.

The present invention also provides a smart navigation method applicable to vehicle navigation, and FIG. 8 is a flowchart showing steps S10 to S40 included in the smart navigation method.

In Step S10, map information is stored in a storage unit. The map information includes road messages in connection with different roads.

In Step S20, a current location of a vehicle is determined via a positioning module. The positioning module detects the current location of the vehicle, and can be a Global Positioning System (GPS) for receiving satellite positioning signals transmitted from a satellite in order to obtain the vehicle's current location. Alternatively, the positioning module can be an Assisted Global Positioning System (AGPS) for receiving reference coordinates and time provided by base stations to shorten the time needed to determine the vehicle's current location. Therefore, the current location of the vehicle can be more quickly and more accurately determined.

In Step S30, a navigation route is generated via a navigation module basing on a target location, the current location and the map information.

In Step S40, when the navigation route includes a plurality of toll roads and one of the toll roads is selected to be excluded from the navigation route, the navigation module generates a new cost-saving navigation route. Thus, a user can, at his or her discretion and according to actual need, select any toll roads to be avoided; and a smart, effective and flexible navigation method is provided.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A smart navigation device, comprising:
   a storage unit storing map information therein;
   a positioning module determining a current location;
   a navigation module being electrically connected to the storage unit and the positioning module, and serving to generate a navigation route based on a target location, the current location, and the map information; and
   an input module being electrically connected to the navigation module, and being arranged for inputting the target location and further displaying the navigation route;
   wherein only when the navigation route displayed on the input module includes a plurality of toll roads displayed on the input module, such that one of the toll roads displayed on the input module is directly selected to be excluded from the navigation route displayed on the input module by a user via utilizing the input module, the navigation module generates a cost-saving navigation route that does not include the toll road displayed on the input module selected by the user.

2. The smart navigation device as claimed in claim 1, wherein the input module is a touch screen, on which the user can touch to exclude the selected toll road.

3. The smart navigation device as claimed in claim 2, wherein the touch screen displays a toll road avoidance icon, to which the toll road being selected to exclude can be dragged for the navigation module to generate the cost-saving navigation route.

4. The smart navigation device as claimed in claim 2, wherein the touch screen displays the toll roads and all other portions on the navigation route in at least two different colors.

5. The smart navigation device as claimed in claim 2, further comprising a wireless Internet access module being electrically connected to the navigation module and serving to receive information about tolls being charged by the toll roads; and the touch screen displaying the toll information corresponding to each of the toll roads on the navigation route or the cost-saving navigation route.

6. A smart navigation method, comprising the following steps:
   storing map information in a storage unit;
   determining a current location via a positioning module;
   generating a navigation route via a navigation module basing on a target location inputted via a input module, the current location, and the map information; and
   displaying the navigation route via the input module;
   wherein only when the navigation route displayed on the input module including a plurality of toll roads displayed on the input module, such that one of which displayed on the input module is directly selected to be excluded from the navigation route displayed on the input module by a user via utilizing the input module, the navigation module generating a cost-saving navigation route that does not include the toll road displayed on the input module selected by the user.

7. The smart navigation method as claimed in claim 6, wherein the input module is a touch screen, and the toll road to be excluded from the navigation route is selected by the user via the touch screen.

8. The smart navigation method as claimed in claim 7, further comprising the following steps: displaying a toll road avoidance icon on the touch screen, and dragging the toll road selected to exclude to the toll road avoidance icon for the navigation module to generate the cost-saving navigation route.

9. The smart navigation method as claimed in claim 7, further comprising the following step: displaying the toll roads and all other portions on the navigation route in at least two different colors.

10. The smart navigation method as claimed in claim 7, further comprising the following steps: receiving information about tolls being charged by the toll roads via a wireless Internet access module, and displaying on the touch screen the toll information corresponding to each of the toll roads on the navigation route or the cost-saving navigation route.

* * * * *